US012566609B2

(12) United States Patent
Tran

(10) Patent No.: US 12,566,609 B2
(45) Date of Patent: Mar. 3, 2026

(54) MICROPROCESSOR WITH APPARATUS AND METHOD FOR HANDLING OF INSTRUCTIONS WITH LONG THROUGHPUT

(71) Applicant: Simplex Micro, Inc., Austin, TX (US)

(72) Inventor: Thang Minh Tran, Austin, TX (US)

(73) Assignee: Simplex Micro, Inc., Austin, TX (US)

( * ) Notice: Subject to any disclaimer, the term of this patent is extended or adjusted under 35 U.S.C. 154(b) by 181 days.

(21) Appl. No.: 18/224,002

(22) Filed: Jul. 19, 2023

(65) Prior Publication Data

US 2024/0311157 A1      Sep. 19, 2024

Related U.S. Application Data

(60) Provisional application No. 63/451,959, filed on Mar. 14, 2023.

(51) Int. Cl.
*G06F 9/38* (2018.01)
(52) U.S. Cl.
CPC .......... *G06F 9/3836* (2013.01); *G06F 9/3838* (2013.01); *G06F 9/3856* (2023.08)
(58) Field of Classification Search
CPC .......................... G06F 9/3836; G06F 9/3838
See application file for complete search history.

(56) References Cited

U.S. PATENT DOCUMENTS

| 5,021,985 A | 6/1991 | Hu et al. |
| 5,185,868 A | 2/1993 | Tran |
| 5,187,796 A | 2/1993 | Wang et al. |
| 5,251,306 A | 10/1993 | Tran |
| 5,497,467 A | 3/1996 | Wakui et al. |
| 5,655,096 A | 8/1997 | Branigin |
| 5,689,653 A | 11/1997 | Karp et al. |
| 5,699,536 A | 12/1997 | Hopkins et al. |

(Continued)

FOREIGN PATENT DOCUMENTS

| EP | 0840213 A2 | 5/1998 |
| EP | 0902360 A2 | 3/1999 |

(Continued)

OTHER PUBLICATIONS

H. O. Kultala et al., "Exposed datapath optimizations for loop scheduling," 2017 International Conference on Embedded Computer Systems: Architectures, Modeling, and Simulation (SAMOS), Pythagorion, Greece, pp. 171-178 (Year: 2017).

(Continued)

*Primary Examiner* — Courtney P Spann
(74) *Attorney, Agent, or Firm* — Appleton Luff

(57) ABSTRACT

A processor includes a time counter and a time-resource matrix and statically dispatches instructions if the resources are available based on data stored in the time-resource matrix. Execution times for the instructions use a time count from the time counter to specify when the instructions may be provided to an execution pipeline. The execution of a second instruction to a functional unit may be replayed due to the throughput time of a first instruction to the same functional unit. A busy bit and next available time of the functional unit are set when the first instruction is sent to the functional unit are the indication to replay the second instruction.

19 Claims, 5 Drawing Sheets

(56) References Cited

U.S. PATENT DOCUMENTS

| | | | |
|---|---|---|---|
| 5,799,163 | A | 8/1998 | Park et al. |
| 5,802,386 | A | 9/1998 | Kahle et al. |
| 5,809,268 | A | 9/1998 | Chan |
| 5,835,745 | A | 11/1998 | Sager et al. |
| 5,860,018 | A | 1/1999 | Panwar |
| 5,870,579 | A | 2/1999 | Tan |
| 5,881,302 | A | 3/1999 | Omata |
| 5,903,779 | A | 5/1999 | Park |
| 5,903,919 | A | 5/1999 | Myers |
| 5,933,618 | A | 8/1999 | Tran et al. |
| 5,958,041 | A | 9/1999 | Petolino, Jr. et al. |
| 5,961,630 | A | 10/1999 | Zaidi et al. |
| 5,964,867 | A | 10/1999 | Anderson et al. |
| 5,974,538 | A | 10/1999 | Wilmot, II |
| 5,996,061 | A | 11/1999 | Lopez-Aguado et al. |
| 5,996,064 | A | 11/1999 | Zaidi et al. |
| 6,003,128 | A | 12/1999 | Tran |
| 6,016,540 | A | 1/2000 | Zaidi et al. |
| 6,035,389 | A | 3/2000 | Grochowski et al. |
| 6,035,393 | A | 3/2000 | Glew et al. |
| 6,065,105 | A | 5/2000 | Zaidi et al. |
| 6,247,113 | B1 | 6/2001 | Jaggar |
| 6,282,634 | B1 | 8/2001 | Hinds et al. |
| 6,304,955 | B1 | 10/2001 | Arora |
| 6,425,090 | B1 | 7/2002 | Arimilli et al. |
| 6,453,424 | B1 | 9/2002 | Janniello |
| 6,591,359 | B1 | 7/2003 | Hass et al. |
| 6,671,799 | B1 | 12/2003 | Parthasarathy |
| 6,959,379 | B1 | 10/2005 | Wojcieszak et al. |
| 7,069,425 | B1 | 6/2006 | Takahashi |
| 7,434,032 | B1 | 10/2008 | Coon et al. |
| 8,166,281 | B2 | 4/2012 | Gschwind et al. |
| 9,256,428 | B2 | 2/2016 | Heil et al. |
| 9,348,590 | B1 | 5/2016 | Kashyap et al. |
| 9,354,884 | B2 | 5/2016 | Comparan et al. |
| 10,339,095 | B2 | 7/2019 | Moudgill et al. |
| 10,346,171 | B2 | 7/2019 | Gabor et al. |
| 10,437,595 | B1 | 10/2019 | Kanapathipillai et al. |
| 11,062,200 | B2 | 7/2021 | Lie et al. |
| 11,132,199 | B1 | 9/2021 | Tran |
| 11,144,319 | B1 | 10/2021 | Battle et al. |
| 11,163,582 | B1 | 11/2021 | Tran |
| 11,188,478 | B1 | 11/2021 | Tran |
| 11,204,770 | B2 | 12/2021 | Tran |
| 11,263,013 | B2 | 3/2022 | Tran |
| 11,467,841 | B1 | 10/2022 | Tran |
| 11,829,187 | B2 | 11/2023 | Tran |
| 11,954,491 | B2 | 4/2024 | Tran |
| 12,061,906 | B2 | 8/2024 | Stephens et al. |
| 2001/0004755 | A1 | 6/2001 | Levy et al. |
| 2003/0023646 | A1 | 1/2003 | Lin et al. |
| 2003/0135712 | A1 | 7/2003 | Theis |
| 2004/0073779 | A1 | 4/2004 | Hokenek et al. |
| 2004/0168045 | A1 | 8/2004 | Morris et al. |
| 2004/0236920 | A1 | 11/2004 | Sheaffer |
| 2004/0243894 | A1 | 12/2004 | Smith et al. |
| 2005/0038980 | A1 | 2/2005 | Rodgers et al. |
| 2005/0251657 | A1 | 11/2005 | Boucher |
| 2006/0010305 | A1 | 1/2006 | Maeda et al. |
| 2006/0095732 | A1 | 5/2006 | Tran et al. |
| 2006/0218124 | A1 | 9/2006 | Williamson et al. |
| 2006/0259800 | A1 | 11/2006 | Maejima |
| 2006/0288194 | A1 | 12/2006 | Lewis et al. |
| 2007/0028078 | A1 | 2/2007 | Harris et al. |
| 2007/0038984 | A1 | 2/2007 | Gschwind et al. |
| 2007/0113058 | A1 | 5/2007 | Tran et al. |
| 2007/0113059 | A1 | 5/2007 | Tran |
| 2007/0255903 | A1 | 11/2007 | Tsadik et al. |
| 2007/0260856 | A1 | 11/2007 | Tran et al. |
| 2008/0114966 | A1 | 5/2008 | Begon et al. |
| 2008/0294882 | A1 | 11/2008 | Jayapala et al. |
| 2009/0113192 | A1 | 4/2009 | Hall et al. |
| 2009/0158279 | A1 | 6/2009 | Iino et al. |
| 2009/0217020 | A1 | 8/2009 | Yourst |
| 2010/0049958 | A1 | 2/2010 | Vaskevich et al. |

| | | | |
|---|---|---|---|
| 2010/0064106 | A1 | 3/2010 | Yamada et al. |
| 2010/0306505 | A1* | 12/2010 | Williamson .......... G06F 9/3828 |
| | | | 712/214 |
| 2011/0099354 | A1 | 4/2011 | Takashima et al. |
| 2011/0153987 | A1 | 6/2011 | Luke et al. |
| 2011/0320765 | A1 | 12/2011 | Karkhanis et al. |
| 2012/0047352 | A1 | 2/2012 | Yamana |
| 2012/0060015 | A1 | 3/2012 | Eichenberger et al. |
| 2012/0124344 | A1 | 5/2012 | Jarvis |
| 2012/0151156 | A1 | 6/2012 | Citron et al. |
| 2013/0151816 | A1 | 6/2013 | Indukuru et al. |
| 2013/0297912 | A1 | 11/2013 | Tran et al. |
| 2013/0298129 | A1 | 11/2013 | Rabinovitch et al. |
| 2013/0346985 | A1 | 12/2013 | Nightingale |
| 2014/0059328 | A1 | 2/2014 | Gonion |
| 2014/0082626 | A1 | 3/2014 | Busaba et al. |
| 2015/0026435 | A1 | 1/2015 | Muff et al. |
| 2015/0089141 | A1 | 3/2015 | Chen et al. |
| 2015/0100754 | A1 | 4/2015 | Reid et al. |
| 2015/0212972 | A1 | 7/2015 | Boettcher et al. |
| 2015/0227369 | A1 | 8/2015 | Gonion |
| 2015/0331760 | A1 | 11/2015 | Dalessandro et al. |
| 2016/0092230 | A1 | 3/2016 | Chen et al. |
| 2016/0092238 | A1 | 3/2016 | Codrescu et al. |
| 2016/0275043 | A1 | 9/2016 | Grochowski et al. |
| 2016/0283240 | A1 | 9/2016 | Mishra et al. |
| 2016/0371091 | A1 | 12/2016 | Brownscheidle et al. |
| 2017/0177345 | A1 | 6/2017 | Ould-Ahmed-Vall et al. |
| 2017/0177354 | A1 | 6/2017 | Ould-Ahmed-Vall |
| 2017/0185407 | A1 | 6/2017 | Shwartsman |
| 2017/0357513 | A1 | 12/2017 | Ayub et al. |
| 2017/0371657 | A1 | 12/2017 | Mahurin et al. |
| 2018/0181400 | A1 | 6/2018 | Scherbinin et al. |
| 2018/0196678 | A1 | 7/2018 | Thompto |
| 2018/0253310 | A1 | 9/2018 | Stephens |
| 2018/0321938 | A1 | 11/2018 | Boswell et al. |
| 2019/0079764 | A1 | 3/2019 | Diamond et al. |
| 2019/0243646 | A1 | 8/2019 | Anderson |
| 2019/0303161 | A1 | 10/2019 | Nassi et al. |
| 2020/0004534 | A1 | 1/2020 | Gurram et al. |
| 2020/0004543 | A1 | 1/2020 | Kumar et al. |
| 2020/0065111 | A1 | 2/2020 | Bouzguarrou et al. |
| 2020/0089528 | A1 | 3/2020 | Gutierrez et al. |
| 2020/0125498 | A1 | 4/2020 | Betts et al. |
| 2020/0310796 | A1 | 10/2020 | Pfister et al. |
| 2020/0319885 | A1 | 10/2020 | Eyole et al. |
| 2020/0371810 | A1* | 11/2020 | Lichtenau ................. G06F 9/50 |
| 2020/0387382 | A1 | 12/2020 | Tseng et al. |
| 2021/0026639 | A1 | 1/2021 | Tekmen et al. |
| 2021/0200550 | A1 | 7/2021 | Sivtsov et al. |
| 2021/0208891 | A1 | 7/2021 | Wen et al. |
| 2021/0311743 | A1* | 10/2021 | Tran ..................... G06F 9/3858 |
| 2021/0326141 | A1* | 10/2021 | Tran ..................... G06F 9/3836 |
| 2021/0389979 | A1 | 12/2021 | Tran |
| 2022/0066760 | A1 | 3/2022 | Chang et al. |
| 2022/0326988 | A1 | 10/2022 | Gunter et al. |
| 2023/0068637 | A1 | 3/2023 | Feiste et al. |
| 2023/0130826 | A1 | 4/2023 | Segger |
| 2023/0214218 | A1 | 7/2023 | Battle et al. |
| 2023/0244490 | A1 | 8/2023 | Tran |
| 2023/0244491 | A1 | 8/2023 | Tran |
| 2023/0367599 | A1 | 11/2023 | Waterman et al. |
| 2023/0393852 | A1 | 12/2023 | Tran |

FOREIGN PATENT DOCUMENTS

| | | |
|---|---|---|
| EP | 0959575 A1 | 11/1999 |
| WO | 0010305 A1 | 2/2000 |
| WO | 0208894 A1 | 1/2002 |
| WO | 0213005 A1 | 2/2002 |
| WO | 2024015445 A1 | 1/2024 |

OTHER PUBLICATIONS

PCT/US2024/02037, Written Opinion of the International Searching Authority, Dec. 11, 2024.
PCT/US2024/020737 International Search Report, Dec. 11, 2024.
Wang, Y., Jia, Z., Chen, R., Wang, M., Liu, D. and Shao, Z., Loop

(56) References Cited

OTHER PUBLICATIONS scheduling with memory access reduction subject to register constraints for DSP applications. Softw. Pract. Exper., pp. 999-1026. (Year: 2014).

Anonymous: "RISC-V—Wikipedia", Apr. 16, 2022 (Apr. 16, 2022), XP093142703, Retrieved from the Internet:URL:https://en.wikipedia.org/w/index.php?title=RISC-V&oldid=1083030760 [retrieved on Mar. 27, 2024].

PCT/US2023/018970, International Preliminary Report on Patentability, Jul. 18, 2024.

PCT/US2023/018996, International Preliminary Report on Patentability, Jul. 19, 2024.

PCT/US2023/018996, Written Opinion of the International Preliminary Examining Authority, Apr. 8, 2024.

PCTUS2023081682, Written Opinion of the International Searching Authority, Mar. 22, 2024.

Written Opinion of The International Preliminary Examining Authority, PCTUS2023/018970, Mar. 25, 2024.

U.S. Appl. No. 17/588,315, filed Jan. 30, 2022, Thang Minh Tran.
U.S. Appl. No. 17/672,622, filed Feb. 15, 2022, Thang Minh Tran.
U.S. Appl. No. 17/697,865, filed Mar. 17, 2022, Thang Minh Tran.
U.S. Appl. No. 17/697,870, filed Mar. 17, 2022, Thang Minh Tran.

U.S. Appl. No. 17/713,569, filed Apr. 5, 2022, Thang Minh Tran.
U.S. Appl. No. 17/254,476, filed Apr. 20, 2022, Thang Minh Tran.
U.S. Appl. No. 17/829,909, filed Jun. 1, 2022, Thang Minh Tran.

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

PCT/US23/27497: Written Opinion of the International Searching Authority.

Written Opinion of the International Searching Authority, PCT/S2022/052185.

Written Opinion of the International Searching Authority, PCT/US2023/018970.

Written Opinion of the International Searching Authority, PCT/US2023/018996.

* cited by examiner

MICROPROCESSOR WITH APPARATUS AND METHOD FOR HANDLING OF INSTRUCTIONS WITH LONG THROUGHPUT

RELATED APPLICATIONS

This application claims priority to U.S. Patent Application Ser. No. 63/451,959, filed Mar. 14, 2023, and entitled "A Microprocessor with Apparatus And Method for Handling of Instructions with Long Throughput," which application is hereby incorporated by reference in its entirety, and which application is assigned to the assignee of the present application.

This application is related to U.S. patent application Ser. No. 17/588,315, filed Jan. 30, 2022, and entitled "Microprocessor with Time Counter for Statically Dispatching Instructions," which application is hereby incorporated by reference in its entirety, and which application is assigned to the assignee of the present application, and related to U.S. patent application Ser. No. 17/713,569, filed Apr. 5, 2022, and entitled "Microprocessor with Apparatus and Method for Replaying Instructions," which application is hereby incorporated by reference in its entirety, and which application is assigned to the assignee of the present application.

TECHNICAL FIELD

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

TECHNICAL BACKGROUND

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from reservation stations or central windows. Designing an OOO superscalar microprocessor has become a huge undertaking. Hundreds of instructions are issued to the execution pipeline where data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

Typically, instructions are decoded and sent to functional units for execution. In most cases, the instructions can be pipelined through the functional units every clock cycle for execution, with the exception of a few instructions such as divide instructions. The latency and throughput times of instructions are used to schedule instructions for execution, but this is cumbersome for instructions with long throughput times. Thus, there is a need for an efficient superscalar microprocessor that executes long throughput instructions out of order.

SUMMARY

The disclosed embodiments provide a processor with a time counter and a method for statically dispatching instructions to an execution pipeline with preset execution times based on a time count from the counter. A source operand that is determined to be no longer valid may be retained in the execution queue for instruction replay.

A disclosed approach to microprocessor design employs static scheduling of instructions. The disclosed static scheduling is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment, a register scoreboard is used to keep track of the write back time of destination registers for all instructions. A subsequent instruction with the same source register reads the register scoreboard and uses the write time as the read time to read data from the register file. The subsequent instruction is scheduled to read the source operand data from the register file at the read time and execute instruction in the functional unit in the next cycle.

In one embodiment a time counter increments periodically, for example, every clock cycle, and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add instruction has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The read buses, the ALUs, and the write buses are the resources represented in a time-resource matrix in which the number of available resources is decremented at the usage times. The resource is based on the throughput time of the functional unit whether the functional unit can accept a new instruction at the particular time. For example, if the throughput time is 1, then the functional unit can accept a new instruction every clock cycle, where a resource is busy for 1 cycle when an instruction is scheduled to execute at a particular time. If the throughput time is 2, then the functional unit can accept a new instruction every 2 clock cycles, where a resource is busy for 2 cycles when an instruction is scheduled to execute at time and time+1. If the throughput time is 32 cycles, then the resource is busy for 32 cycles which has 3 problems: (1) setting the busy bits for 32 cycles requires different logic, (2) when the instruction is replayed in most cases, busy bits are not reset which may cause a performance issue for executing other divide instructions, and (3) the next instruction to the same functional unit must check for the time-resource matrix for many cycles and stalling in the instruction issue unit until the busy bits are not set.

In one embodiment, the next available time of the functional unit is set when a long throughput instruction is dispatched to the functional unit. The time-matrix resource is set to a single throughput cycle for the long throughput instruction, allowing multiple long throughput instructions to be issued in consecutive cycles. The first long throughput instruction is dispatched to the functional unit and executed as expected. The first long throughput instruction sets the next available time of the functional unit. The second instruction to the same functional unit will be replayed based on the next available time. Fortunately, the replay mechanism is already in play for delaying of the write time in the register scoreboard. The above 3 problems are resolved with the use of the next available time register.

BRIEF DESCRIPTION OF THE DRAWINGS

Aspects of the present invention are best understood from the following description when read with the accompanying figures.

DETAILED DESCRIPTION

Figure 1:
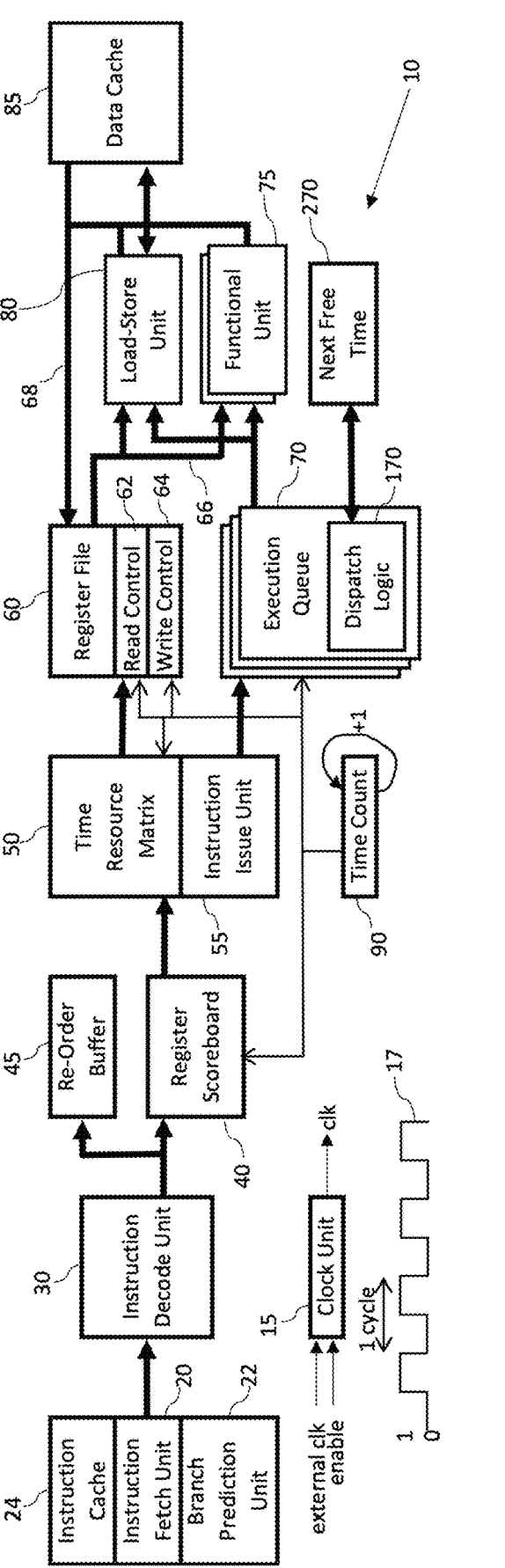
FIG. 1 is a block diagram illustrating a processor based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have throughput time of 1 and latency time of 3 (based on a data cache hit), and the divide instruction has throughput and latency times of 32. All instructions can be scheduled with preset times for execution based on the known throughput and latency times of all instructions. Unfortunately, the latency time of the load instruction is based on data cache hit time. The latency time of the load instruction can be greater than the time for accessing the data cache due to data bank conflict, error correction data, and accessing external memory when data is not in the data cache. There are more causes for delay of the load instructions. When the load result data are delayed, the load instruction will be replayed along with subsequent instructions with data dependency on the load result data. The time-based microprocessor must therefore include a replaying mechanism for replaying of instructions due to unexpected delay of result data.

FIG. 1 is a block diagram of a microprocessor based data processing system. The exemplary system includes a microprocessor 10 having a clock unit 15, an instruction fetch unit 20, a branch prediction unit 22, an instruction cache 24, an instruction decode unit 30, a register scoreboard 40, a re-order buffer 45, a time-resource matrix 50, an instruction issue unit 55, a register file 60, a read control unit 62, a write control unit 64, a plurality of execution queues 70, a plurality of functional units 75, a load-store unit 80, and a data cache 85. Dispatch logic 170 associated with execution queue 70 which is described in further detail in connection with FIG. 5 supports replay of instructions when a source operand is delayed. A next free time register 270, coupled to dispatch logic 170 is associated with a functional unit 75 with long throughput time to set the next free time of the functional unit 75. The microprocessor 10 includes a plurality of read buses 66 coupling the register file 60 to the functional units 75 and load-store unit 80. The system also includes a plurality of write buses 68 to write result data from the functional units 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further receive an enable signal to disable the clock unit when the microprocessor is in an idle stage or otherwise not used for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70. The register scoreboard 40 resolves data dependencies in the instructions. The time-resource matrix 50 checks availability of the various resources which in one embodiment includes the read buses 66, the functional units 75, the load-store unit 80, and the write buses 68.

The read control unit 62, the write control unit 64, and the execution queues 70 receive the corresponding scheduled times for reads, writes and execution, respectively, from the instruction issue unit 55. The read control unit 62 is set to read the source operands from the register file 60 on specific read buses 66 at a preset time, discussed below. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction issue unit 55 receives inputs from the register scoreboard 40 that indicate that the instruction is free of any data dependency and receives inputs from the time-resource matrix 50 that indicate that resources are available to set the "preset times" for the instruction to be executed in the execution pipeline.

In the microprocessor system 10 the instruction fetch unit 20 fetches the next instruction(s) from the instruction cache 24 to send to the instruction decode unit 30. One or more instructions can be fetched per clock cycle from the instruction fetch unit 20 depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled with the branch prediction unit 22 for prediction of the next instruction address when a branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and is also coupled to the re-order buffer 45 and the register scoreboard 40. The instruction decode unit 30 decodes the instructions for instruction type, instruction throughput and latency times, and the register operands. The re-order buffer 45 keeps track of all instructions in the execution pipeline. The instructions can be executed out-of-order but they must be retired in-order (the same order as they are sent from the instruction decode unit 30. When the instructions complete execution and write back to valid destination registers of the register file 60, then they are retired in order from the re-order buffer 45. The instructions after a branch instruction or an exception/interrupt can be cancelled and flushed if the branch instruction is mis predicted. The re-order buffer 45 is responsible to flush these cancelled instructions.

The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions and hence keeps a time entry for each destination register for all pending instructions in the execution pipeline. In the preferred embodiment the completion time is maintained in reference to the time count 90.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a tangible, non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a tangible, non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2:
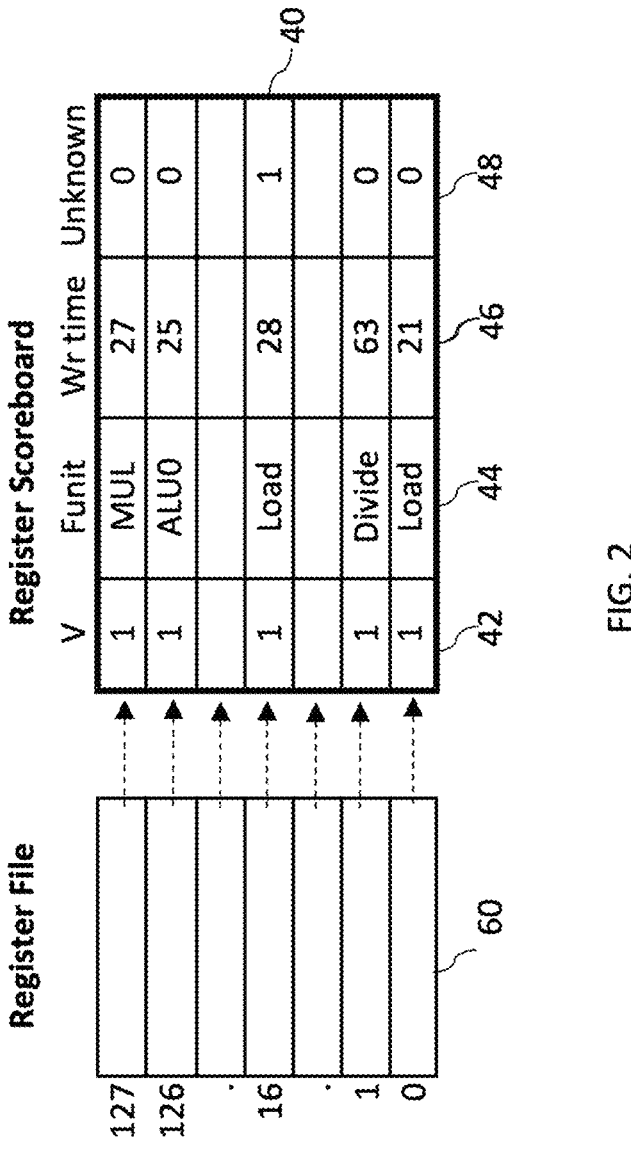
FIG. 2 is a block diagram illustrating a register file and a register scoreboard.

FIG. 2 illustrates the register file 60 and the register scoreboard 40. In one embodiment, the register file 60 has 128 registers, numbered as registers 0 to 127 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44 unless the unknown field 48 is set. As examples illustrated in FIG. 2, register 0 is written back at time count 21 from the load-store unit 80. Register 1 is written back at time count 63 from the divide unit (one of the functional units 75). Register 126 is written back at time count 25 from the ALU0, (another of the functional units 75), etc. as illustrated in FIG. 2. Register 16 has the unknown bit set indicating that the load data from the load-store unit 80 have an unknown write-back time. The write time 46 is the time in reference to the time count 90 when the result data is written to the register file 60. The data is not available from the register file 60 until the next clock cycle, but the result data can be forwarded from the functional unit 44 in the register scoreboard 40. For example, if the value of the time count 90 is 19, then the load-store unit 80 produces the result data in 2 clock cycles for writing back to the register 0 of the register file 60 at time count 21. When the load instruction is issued, the write time is based on the data cache hit time to set the write time 46 of the register scoreboard 40. The load data may be delayed which will cause the write time 46 of the register scoreboard 40 to be modified based on the delay time. In an example, the write time 46 of the load may be modified based on the latency of a L2 cache (not shown, outside of the processor 10). The load data can be further delayed because of a L2 cache miss and the delay time may be unknown, in which case the unknown field 48 of the register scoreboard 40 is set. A subsequent instruction with RAW data dependency on the destination register of the load instruction is rescheduled (or replayed) as the write time for the destination register changes. The mechanism to replay instructions will be detailed later in the description of the execution queue 70.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data is in the register file 60 and can be accessed at any time provided availability of the read buses 66, otherwise the write time 46 is the earliest time to issue the instruction. To further explain, the register scoreboard records the write time of an instruction to a register of the register file 40. A subsequent instruction sourcing the same register, reads the write time 46 as the read time for the subsequent instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 4 assuming a data cache hit. In another example, if the current time count is 5 and the source registers of an add instruction receive write time counts of 22 and 24 from the register scoreboard 40, then the read time count for a subsequent instruction is set at 24. In this case, the execution and the write time counts are both 25 for the add instruction. As shown in FIG. 1, the register scoreboard 40 is coupled to the time-resource matrix 50 where the read, execute, and write phases of an instruction access the time-resource matrix 50 for availabilities of the resources.

Figure 3:
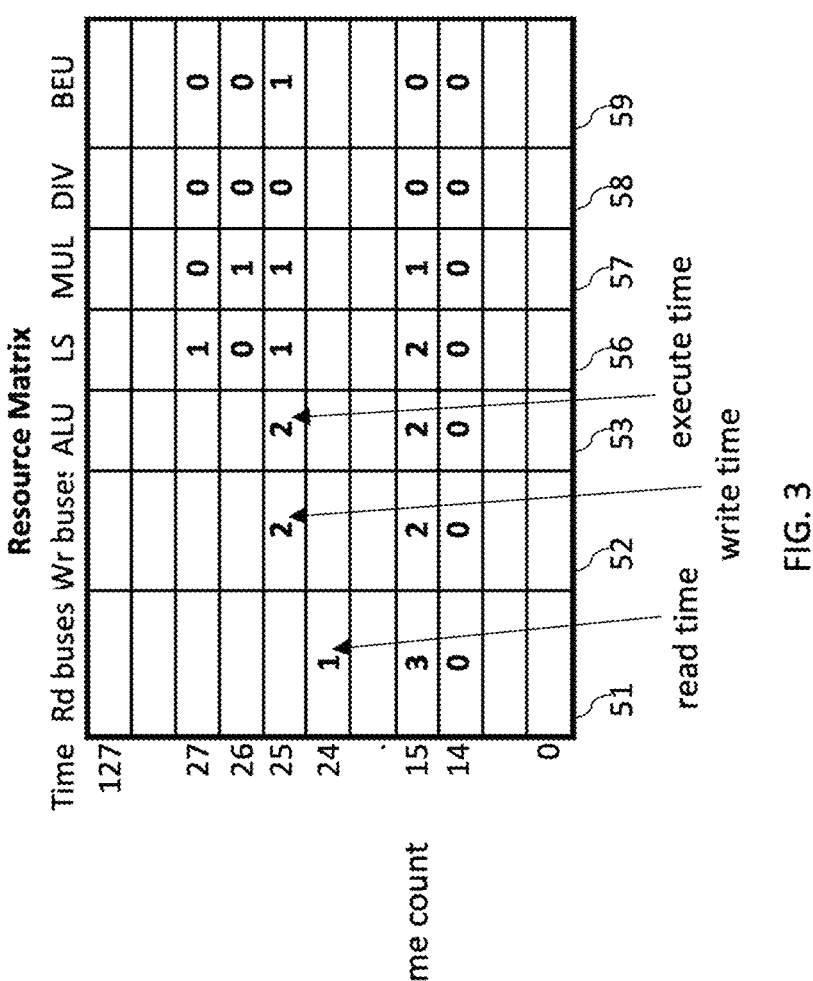
FIG. 3 is a block diagram illustrating a time-resource matrix.

FIG. 3 illustrates the time-resource matrix 50. The time-resource matrix 50 preferably includes the same number of time entries as the time counter 90. For example, if the time counter 90 returns to zero after 128 cycles, then the time-resource matrix 50 preferably has 128 entries. The time counter is incremented every clock cycle and rotates back from the 127th entry to the 0th entry. The columns in the time-resource matrix 50 represent the availability of specific resources. In the embodiment shown in FIG. 3 the time-resource matrix 50 is arranged to identify the availability of resources by identifying the resources that are busy, and specifically the read buses 51, the write buses 52, the ALUs 53, the load-store ports 56, the multiply unit 57, the divide unit 58, and the branch execution unit (BEU) 59. These resources are an example, and if other functional units are provided by microprocessor 10 those are also included in the time-resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port column 56 corresponds to the load-store unit 80 of FIG. 1. The load instructions are issued from the instruction issue unit 55 with the expectation of data being in the data cache 85 (a data cache hit). In one embodiment, when the data is not present in the data cache 85, then the load instruction changes the write time in the register scoreboard 40 for latency time of a level 2 (L2) cache. The processor 10 supports a replay load instruction which re-executes a load instruction in the event of a cache miss. The instructions that are dependent on the destination register of the replay load instruction are also replayed. The same procedure is used for replaying instructions where the new replay read time, replay execute time, and replay write time are determined based upon a check of the time-resource matrix 50 for availability of resources. The replay instructions are statically scheduled for execution with the same procedure as issued instructions to the same functional unit.

In one embodiment, the throughput time of an instruction is used to set the busy time in the time-resource matrix 50 of the corresponding functional unit. For example, if the throughput time of the MUL instruction is 2 cycles, then if the MUL instruction execution time is 25, then the MUL busy bits in column 57 for times 25 and 26 are set to busy to block another MUL instruction from using the MUL functional unit at these times. The divide instruction has a throughput time of 33 and 66 for 32-bit or 64-bit divide, respectively. It is difficult to set the long throughput time and the many busy bits may block and stall the subsequent divide instruction in the instruction issue unit 55 for many cycles. In one embodiment, the divide instruction sets only 1 busy cycle in the column 58 of the time-resource matrix 50 regardless of the divide throughput time. The replay mechanism for the divide instruction is used to block the subsequent divide instruction from being sent to the same divide unit which will be discussed later as part of the execution queue in FIG. 5.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, 1 read bus is busy, at execution time 25, 2 ALUs, 1 load-store port, 1 multiply unit, and 1 BEU are taken for execution of previous instructions, and at write time 25, 2 write buses are busy. In one embodiment, the numbers of read buses, write buses, ALUs, load/store ports, multiply unit, divide unit, and BEU are 4, 4, 3, 2, 1, 1, and 1, respectively. If an add instruction with 2 source registers and 1 destination register is issued with read time of 24, execution time of 25, and write time of 25, then the number of read buses 51 at time 24, write buses 52 at time 25, and ALUs 53 at time 25 are incremented to 3, 3, and 3, respectively. The read bus 51 indicates that 1 read bus is busy, so the next 2 read buses 1 and 2 (in-order) are assigned to the source registers of the add instruction. The ALU unit 53 indicates that 2 ALUs are busy, so the next in-order ALU 2 is assigned as functional unit for execution of the add instruction. The write bus 52 indicates that 2 write buses are busy, so the next in-order write bus 2 is assigned to write back data from ALU 2 to the register file 60. The resources are in-order assigned to the instructions as with the replay resources. The source registers of the add instruction will receive data from read buses 1 and 2, ALU 2 is used for execution of the add instruction and write bus 2 is used to write back data from ALU 2. The counts in the row are reset by the time count. As illustrated in FIG. 3, when the time count is incremented from 14 to 15, all resource counts of row 14 are reset. All resource counts of row 15 are reset when the count is incremented to 16 in next cycle. In the embodiment of FIG. 3 resources are assigned to the issued instruction in-order of the resource count. If an issued instruction is a multiply instruction with execution time of 25, since there is only one multiply unit 57, the issued instruction cannot be issued for execution time of 25. In another embodiment, two read times, two execution times, and two write times are used per instruction with expectation that one set of times is free of conflict, increasing the chance for instruction issuing. The two read times, two execution times and two write times are generated and then checked against the time resource matrix, and if there is a conflict with the first of times the second set of times is selected. The invention does not limit the number of sets of times for accessing the time resource matrix. In another embodiment, the counts indicate the number of available resources and the resource counts are decremented if the resource is assigned to an issued instruction.

In one embodiment, each resource represented in the time-resource matrix 50 is implemented as an independent register file where the number of entries is the same as the time counter 90, and each entry consists of a resource count. The issue or replay instruction accesses individual resources as needed, instead of accessing all resources in the time-resource matrix 50.

The availability of all resources for the required times are read by the instruction issue unit 55 from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts for the instruction in question are incremented by one, and the time-resource matrix 50 is checked as soon as the same cycle or next cycle. The particular the number of read buses 66, write buses 68, and functional units 75 in FIG. 1 is preferably chosen to minimize stalling of instructions in the instruction issue unit 55.

Figure 4B:
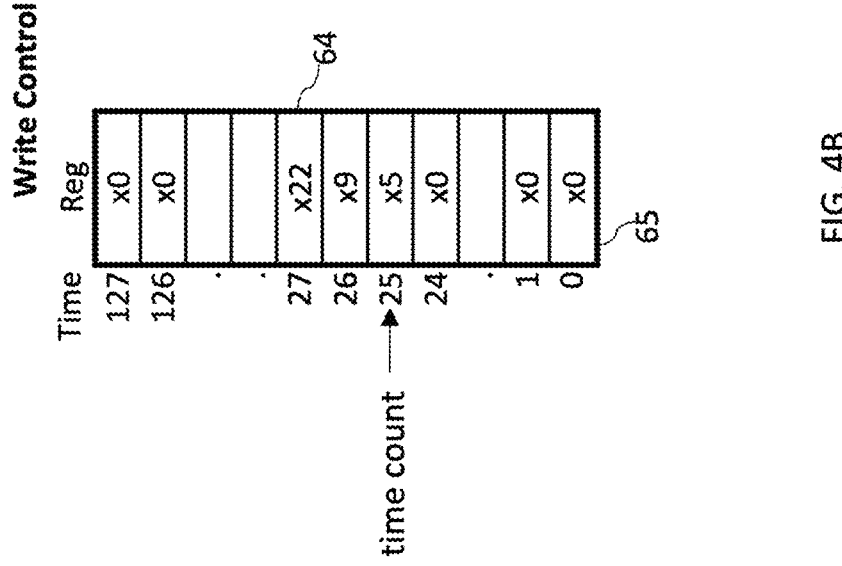
FIGS. 4A and 4B are block diagrams illustrating a read control unit and a write control unit.
Figure 4A:
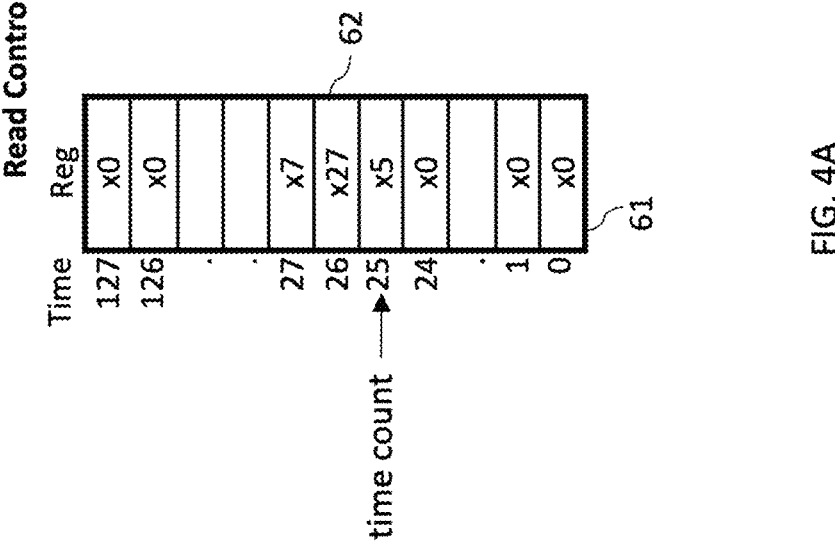

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The column in the read control unit 62 represents the source register 61. The column in the write control unit 64 represents the destination registers in the write bus 65. In one embodiment, microprocessor 10 uses the RISC-V instruction set architecture. In that architecture, register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. As illustrated in FIGS. 4A and 4B, when the time count is incremented from 25 to 26, the register fields 61 and 65 of row 25, shown as x5 will be reset to x0 to indicate that those resources have been freed up. The register fields 61 and 65 of row 26, x27 and x9 respectively, are reset to x0 when the count is incremented to 27 in the next cycle. FIGS. 4A and 4B show a single read bus 66 and a single write bus 68, respectively. If, however, 4 read buses and 3 write buses are implemented, then the functionality of FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set and the write time 46 is greater than the time count 90, then the instruction is replayed where the write time 46 is the read time for the replay instruction. The replayed instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 4B, the register x5 from the register field 65 of the write control unit 64 at time count of 25 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 5:
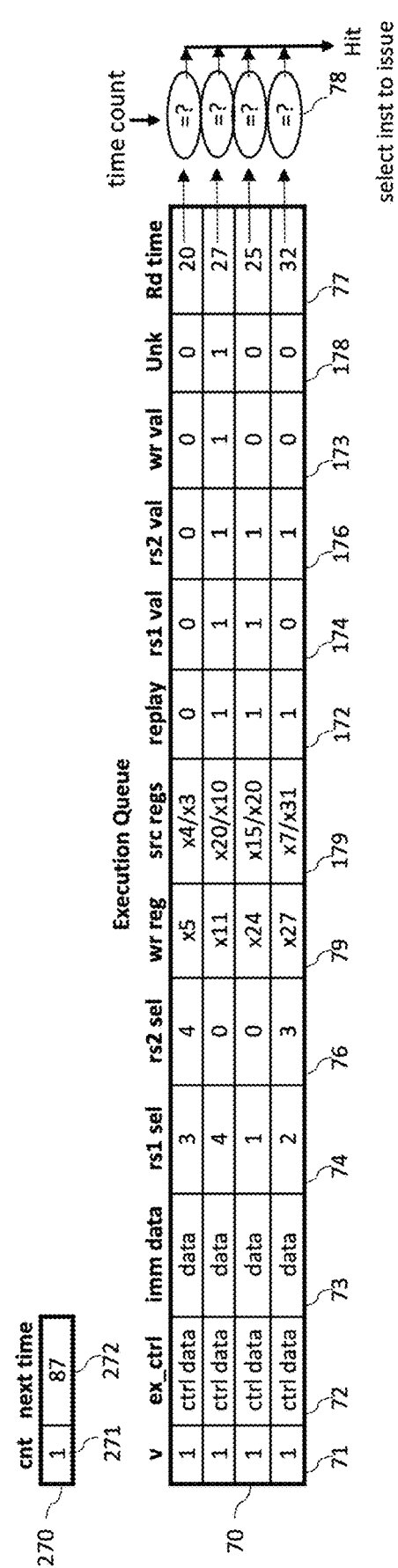
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: valid bit 71, control data 72, immediate data 73, first source register select 74, second source register select 76, read time 77, destination register number 79, source register numbers 179, replay valid 172, first source register valid 174, second source register valid 176, write valid 173, and unknown bit 178. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. The destination register number 79 and the source register numbers 179 are referenced to registers in the register file 60. These register numbers are used only for replaying of an instruction.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries may be issued to the functional units out-of-order. The read time field 77 indicates that the fourth entry is issued at time count 20, the second entry is issued at time count 25, the third entry is issued at time count 27, and the first entry is issued at time count 32.

FIG. 5 shows four examples of instruction types in the execution queue 70. The fourth entry (shown as the top row) is normal dispatching of an instruction to a functional unit 75 at read time 20, and the first source operand data is from fourth read bus 66 as indicated by the first source register select 74 and the second source operand data is from fifth read bus 66 as indicated by the first source register select 76. In one embodiment, the control data 72 includes identification of a functional unit 75 for dispatching of the instruction. The control data 72 and immediate data 73 are dispatched to the functional unit. The valid bit 71 is reset at time 20 from the read time 77 when the instruction is dispatched to the functional unit 75. The other fields (172, 174, 176, 173, 178) of the fourth entry are not used as the instruction is not replayed.

In an embodiment, the operations to execute an instruction from the instruction decode unit 30 of the microprocessor 10 are: (1) decoding the instructions in the instruction decode unit 30 to identify operand registers, instruction type, latency and throughput times, (2) accessing the register scoreboard 40 for RAW data dependency in which the worst case write time 46 of the register scoreboard 40 is the read time of the instruction and the execution and write times are calculated, (3) accessing the time-resource matrix 50 for availability of resources such as the read port(s), the functional unit, and write port based on the read, execution, and write times to set the read port control 62, write port control 64, and to dispatch the instruction to an execution queue 70, (4) the execution queue 70 dispatches the instruction to a functional unit 75, and the read port control 62 accesses the register file 60 to read source operand data and the register scoreboard 40 to confirm data from the register file 60 or to forward data from a functional unit 75 or to replay the instruction where all information is processed by the dispatch logic 170 to determine if the instruction is replayed, (5) if the instruction is not replayed, then it is executed in one functional unit 75 or load-store unit 80 and produces result data at the expected write time, (6) the write port control 64 accesses the register scoreboard 40 to ensure that the write time 46 has not been delayed, resets the valid bit 42 of the destination register, and uses the functional unit 44 to write the result data from the functional unit 75 or the load-store unit 80 to the register file 60. If the result data is not written by the load-store unit 80 at the expected write time to the register file 60, then the load data can be delayed by a data cache miss or data bank conflict. In this example, the instruction can be replayed in operation (4) as determined by the dispatch logic 170 of the execution queue 70 or operation (6) and the entry in the execution queue 70 remains valid and sets replay bit 171 along with many other bits in the execution queue 70 as shown in FIG. 5.

The first entry of FIG. 5 (shown as the bottom row) illustrates replaying of an instruction in accordance with the above step (4) where the write time 46 in the register scoreboard 40 is greater than the time count 90 for the first source register. The read port control 62 accesses the source register information from the register scoreboard 40 and sends to the dispatch logic 170 to determine if the instruction is to be replayed. In this example, the second source operand data are valid but the first source operand data are not valid.

The second source register valid bit 176 is set and the second source operand data are written into immediate data field 73. The replay instruction needs to fetch only the first source operand data for execution. The write time 46 in the register scoreboard 40 for the first source register is used as the new read time to replay the instruction. The write times 46 of the register scoreboard 40 for both source registers can be greater than the time count 90 and the read time for replaying the instruction is based on the longest write time 46. The dispatch logic 170 also calculates the execution and write times based on the latency time of the instruction from the read time. The read time and calculated execution and write times are used to access the time-resource matrix 50 for availability of read port, functional unit, and write port as when the instruction was issued from instruction issue unit 55. If the resources are available, then the new read time is written into the read time 77. Note that the read time entry of the read port control 62 is written with the source register(s) and the write time entry of the write port control 64 is written with the destination register which is from the write register 79 of the execution queue 70. If at least one resource (the read port, functional unit, or write port) is not available at the replay time from the time-resource matrix 55, then the unknown bit 48 in the register scoreboard 40 is set for the destination register 79 and the unknown bit 178 in the execution queue 70 is set to cause the instruction to be replayed by the retire order of instruction. In another embodiment, two read times, two execution times, and two write times are used per replay instruction with the expectation that one set of times is free of conflict, increasing the chance for instruction issuing which is the same mechanism for issuing instruction from instruction issue unit 55. In another embodiment, the re-order buffer 45 in processor 10 is used to track the order of instructions as they are issued from the instruction decode unit 30 and to retire the instructions in-order after the instructions are executed out-of-order. The re-order buffer 45 is coupled with the execution queues 70 to indicate that the unknown entry is the next instruction to be retired in-order. Note that the control data field 72 of the execution queue 70 includes the re-order buffer entry to synch with the re-order buffer retire entry. At the retire order, the unknown entry of the execution queue 70 repeatedly accesses the time-resource matrix 50 for available resources until the unknown entry can be dispatched to functional unit 75 in the next cycle. The execution queues 70 must maintain the source and destination register numbers in the write register field 79 and source registers field 179 in order to access the register file 60 and the register scoreboard 40.

The second entry of FIG. 5 illustrates replaying of a load instruction in accordance with the above operation (6) where the load data delay is detected and does not write load data back to the register file 60 at the expected write time. As an example, the data cache miss is not known at the time the load instruction is dispatched from the execution queue 70 to the load-store unit 80. The second entry remains valid until the cycle where the data cache hit or miss is determined, at which time the valid bit 71 of the second entry can be reset or remain set for replaying. It is important for the entry in the execution queue 70 to remain valid until the load is completed as the execution queue full signal stalls the next load or store instructions in the instruction issue unit 55 of the processor 10. The L2 cache latency time updates the write time 46 in the register scoreboard 40 for the destination register and the read time 77 of the second entry of the execution unit 70. Both first and second source register valid bits 174 and 176 are set to indicate that this load instruction (second entry of the execution queue 70) is waiting for the load data. When the read time 77 of the second entry matches the time count 90, the load data from L2 cache should be valid and is written back to the register file 60, and the valid bit 42 of the register scoreboard 40 and the valid bit 72 of the second entry of the execution queue 70 are reset. The L2 cache can be a cache miss and not return data at the expected time, in which case the unknown bit 178 of the execution queue 70 and the unknown bit 48 of the register scoreboard 40 for the destination register are set. This case is illustrated in the third entry of FIG. 5. The data cache miss is only one example of a load data delay. As examples, other load data delays can arise from a data bank conflict when more than one load data requests are to the same bank and an ECC 1-bit correctible error delay, as well as a combination of multiple load data delays.

The third entry of FIG. 5 illustrates replaying of a load instruction with unknown time. The external memory (not shown) outside of the processor 10 returns load data at some later time, writes into the immediate data field 73, and write valid bit 173 of the third entry of the execution queue 70 is set. At the retire order, if the write valid bit 173 is not valid, then the third entry must wait until the write valid bit 173 is set. If the write valid bit 173 is set, then the unknown entry repeatedly accesses the time-resource matrix 50 for available write buses 52 and replay write buses 152 until the immediate data 73 can be written to the register file 60 with the destination register in the write register 79 in the next cycle. Since no issue or replay instruction uses the write buses resources of the time-resource matrix 50 in the next clock cycle, in this example the third entry of the execution queue 70 can use any available write bus resource in the next cycle without any conflict. Along with writing data back to the register file 60, the valid bit 42 in the register scoreboard 40 and the valid bit 71 of the third entry of the execution queue 70 are reset.

In one embodiment, shown in FIG. 5, a next free time register 270 is employed with the divide execution queue 70. As a divide instruction is dispatched to the functional unit 75, the counter bits 271 of the next free time register 270 are set. The throughput time of the divide instruction is added to the time count and written to the next time field 272. The divide unit is busy until the time indicated in the next time field 272. When the time count matches with the next time field 272, then the counter bits 271 are decremented by 1. A subsequent divide instruction cannot be sent to the divide functional unit (one of the functional units 75) until after the valid time in the next free time register 270. If a divide instruction is issued from the execution queue 70 and the counter bits 271 do not equal zero, then the divide instruction will be replayed with the new read time from the next time field 272. The divide instruction accesses the time-resource matrix 50 to validate the replay and to set the read control unit 62 and write control unit 64. The divide instruction can be replayed based solely on the next free time register 270. The source registers must check the register scoreboard 40 again to ensure that valid data can be read from the register file 60. When there are multiple instructions in divide execution queue 70, the first instruction is sent to divide functional unit 75 while subsequent divide instructions will be replayed. To avoid replaying of subsequent divide instruction in the same clock cycle, the counter 271 is used to set a different replaying time. In the example, the second divide instruction is replayed at time 87 per the next time field 272 of the next free time register 270 and the counter bits 270 are set to 2. The third divide instruction is replayed at time 88, 1 cycle later, and the fourth divide instruction is replayed at time 89. When the second divide instruction is sent to the divide functional unit 75 at time 87, then the counter bits are set to 1. The third and fourth divide instructions are again issued from the divide execution queue 70. The third divide instruction will be set to replay at the next throughput time of the divide instruction and the fourth divide instruction will be set to replay in a cycle later.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention. Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
a time counter storing a time count representing a current time of the processor, wherein the time count is incremented periodically;
an instruction issue unit coupled to the time counter that receives a first instruction, and issues the first instruction with a first preset execution time based on the time count;

an execution queue coupled to the time counter and the instruction issue unit that receives the first instruction from the instruction issue unit, and dispatches the first instruction to a functional unit when the first preset execution time corresponds to the time count; and
dispatch circuitry that determines if the functional unit is busy at the first preset execution time and if so then retains the first instruction in the execution queue and causes replay of the first instruction based on a next free time provided by a next free time register coupled to the dispatch circuitry.

2. The processor of claim 1 further comprising:
a clock circuit that causes the time counter to increment the time count with each clock cycle of the clock circuit; and
wherein the time counter comprises an N-bit counter which counts from a zero count to an Nth-bit count value, which represents a largest preset time for the instruction issue unit to issue an instruction;
wherein the N-bit counter returns to the zero count after reaching the Nth-bit count value.

3. The processor of claim 1 further comprising:
a register scoreboard storing a write time of a selected register from a plurality of registers in a register file, wherein the write time is a preset time based on the time count;
an instruction decode unit coupled to the register scoreboard, wherein the instruction decode unit reads a write time for each source operand of the first instruction from the register scoreboard, and wherein the register scoreboard uses one or more write times to determine an execution time for the first instruction; and
a time-resource matrix unit, coupled to the register scoreboard, comprising a plurality of time-resource registers for storing information relating to available resources for each time count of an N-bit time counter;
wherein the time-resource registers store information for resources that include at least one of: a plurality of read buses, a plurality of write buses, and a plurality of each type of functional units; and
wherein the time-resource matrix unit uses the execution time of the first instruction to further check availability of the plurality of read buses, the plurality of write buses, and the plurality of each type of functional units to issue the first instruction at a second preset execution time.

4. The processor of claim 3, wherein the plurality of time-resource registers include a shared resource wherein the shared resource can be read and incremented by one or more of the instruction issue unit, a coprocessor, or by replay of an instruction.

5. The processor of claim 1 further comprising:
read control circuitry having registers storing time count entries specifying when operands may be read and transported on a read bus, and wherein the read control circuitry further accesses a register scoreboard to determine availability of a first register in a register file, wherein if a write time of the first register is the same as the time count then data is forwarded from the first register instead of being read from the register file.

6. The processor of claim 5 further comprising:
a write control circuitry having a plurality of write bus control registers, each write bus control register storing a time count entry specifying when result data may be transported on a write bus and written to a second register of the register file;

wherein the write control circuitry further accesses the register scoreboard to clear a valid bit if the write time stored in the write bus control register is the same as the time count.

7. The processor of claim 6 wherein the execution queue stores a plurality of instructions, the functional unit is one of a plurality of functional units and each instruction includes a first read time which is represented by a preset time count wherein the execution queue dispatches instructions to at least a selected functional unit and wherein dispatching of a long throughput instruction to the selected functional unit sets a busy bit associated with the selected functional unit and records a next available time of the functional unit.

8. The processor of claim 7 wherein the read control circuitry is synchronized with a second read time in the execution queue.

9. The processor of claim 7 wherein each instruction of the execution queue includes a replay bit to replay a corresponding instruction if such corresponding instruction was not completed at a corresponding preset time.

10. The processor of claim 9 wherein each instruction in the execution queue further includes an immediate data field and a source valid bit that is set at a time at which the replay bit is set, and a valid source operand data is written into the immediate data field.

11. A processor comprising:
a clock circuit;
a time counter storing a time count representing a specific time of operation of the processor, wherein the time count is incremented by the clock circuit;
a time-resource matrix coupled to a register scoreboard and the time counter for storing information relating to available resources for each time count of the time counter;
an instruction issue unit coupled to the time counter for receiving a first instruction, and issuing or stalling the first instruction at a first preset execution time, as represented by the time count, based on availability of the available resources as provided by the time-resource matrix;
an execution queue coupled to the time counter and the instruction issue unit to receive the first instruction from the instruction issue unit, and dispatch the first instruction to a functional unit when the first preset execution time matches the time count;
dispatch circuitry to determine if a busy bit of the functional unit is set to replay the first instruction at a new read time determined from a time count at which the functional unit is next available;
the register scoreboard storing a write time of a register in a register file, wherein the write time is a future time specified by the time count;
an instruction decode unit coupled to the register scoreboard, the instruction decode unit reading a write time for each source operand of a selected instruction from the register scoreboard, and using the write times corresponding to the selected instruction to determine an execution time for the selected instruction; and wherein the available resources include at least one of a plurality of read buses, a plurality of write buses, and a plurality of functional units.

12. A computer program product for issuing an instruction, the computer program product stored on a non-transitory computer readable storage medium and including instructions for causing a computer system to execute a method that is executable by a processor, the method comprising:
issuing an instruction to an execution queue to execute at a preset time, wherein the preset time is a time defined by a time count from a periodically incremented time counter;
dispatching the instruction from the execution queue to a functional unit when the preset time corresponds to the time count; and
retaining the instruction in the execution queue and replaying the instruction at a next free time if a dispatch circuitry determines that the functional unit is busy at the preset time.

13. The computer program product of claim 12 wherein the method further comprises:
operating the time counter to provide a maximum time count corresponding to a latest preset time to issue an instruction.

14. The computer program product of claim 13 wherein the method further comprises:
storing a write time of a register of a register file wherein the write time is a preset time defined by the time count.

15. The computer program product of claim 14 wherein the method further comprises:
storing information corresponding to available resources for each time count in a time-resource matrix, wherein the resources comprise at least one of a plurality of read buses, a plurality of write buses, and a plurality of functional units.

16. The computer program product of claim 15 wherein the method further comprises:
storing in a register of a read control circuitry a read time that specifies when data may be read from a register file and transported on a read bus.

17. The computer program product of claim 16 wherein the method further comprises:
storing in a register of a write control circuitry a write time that specifies when result data may be transported on a write bus and written to a register of the register file.

18. The computer program product of claim 17 wherein the method further comprises:
storing a plurality of instructions in the execution queue, wherein each instruction includes a read time defined by the time count.

19. The computer program product of claim 18 wherein the method further comprises:
synchronizing the read time of the execution queue with the read control circuitry.

* * * * *